United States Patent
Fang et al.

(10) Patent No.: US 8,307,975 B2
(45) Date of Patent: Nov. 13, 2012

(54) SOLID FEED GUIDE APPARATUS FOR A POSIMETRIC SOLIDS PUMP

(75) Inventors: Yichuan Fang, Houston, TX (US); Steven Craig Russell, Houston, TX (US); Kellan William McCarthy, Humble, TX (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 12/763,040

(22) Filed: Apr. 19, 2010

(65) Prior Publication Data

US 2011/0253510 A1     Oct. 20, 2011

(51) Int. Cl.
*B65G 31/00*     (2006.01)
(52) U.S. Cl. ............................ 198/640; 198/642; 406/99
(58) Field of Classification Search .................. 198/639, 198/640, 641, 642; 406/96, 99; 415/90; 110/101 R, 106, 115
See application file for complete search history.

(56) References Cited

U.S. PATENT DOCUMENTS

| | | | |
|---|---|---|---|
| 3,885,665 A * | 5/1975 | Fisher | 198/642 |
| 4,516,674 A | 5/1985 | Firth | |
| 4,988,239 A | 1/1991 | Firth | |
| 5,051,041 A | 9/1991 | Firth | |
| 5,355,993 A | 10/1994 | Hay | |
| 5,381,886 A | 1/1995 | Hay | |
| 5,402,876 A | 4/1995 | Hay | |
| 5,485,909 A | 1/1996 | Hay | |
| 5,497,873 A | 3/1996 | Hay | |
| 5,551,553 A | 9/1996 | Hay | |
| 5,657,704 A | 8/1997 | Schueler | |
| 6,213,289 B1 * | 4/2001 | Hay et al. | 198/642 |
| 6,685,007 B1 * | 2/2004 | Gustavsson | 198/642 |
| 2008/0142340 A1 * | 6/2008 | Baer et al. | 198/642 |
| 2012/0067702 A1 * | 3/2012 | Frey et al. | 198/642 |

* cited by examiner

*Primary Examiner* — James R Bidwell
(74) *Attorney, Agent, or Firm* — Fletcher Yoder P.C.

(57) ABSTRACT

In one embodiment, a system includes a posimetric pump guide configured to mount in a port of a posimetric pump. The posimetric pump guide includes a first flow splitter defining first and second distribution channels into first and second passages in the posimetric pump. The first flow splitter includes a first pair of shroud walls spaced apart about a first disc opening. The posimetric pump guide also includes an abutment extending crosswise to the first flow splitter.

20 Claims, 4 Drawing Sheets

SOLID FEED GUIDE APPARATUS FOR A POSIMETRIC SOLIDS PUMP

BACKGROUND OF THE INVENTION

The subject matter disclosed herein relates to a pump for a solid, such as particulate matter, and more particularly, to a solid feed guide.

A posimetric pump provides positive metering of solids, such as particulate fuels or other matter. For example, the posimetric pump may force the solids into a solids lock condition, with the solids keyed to a rotating part of the posimetric pump, thereby driving the solids from an inlet to an outlet in a metered quantity. At the outlet, the posimetric pump may force the solids into a solids seal condition, wherein the solids block backflow of a gas at high pressure. The performance of the posimetric pump is at least partially dependent on the intake efficiency of the solids flowing through the inlet to the rotating part of the posimetric pump. Unfortunately, existing posimetric pumps often intake solids along an abrupt path, thereby resisting solids flow and reducing filling efficiency. For example, the abrupt path may cause stationary pockets of solids, voids, or other non-uniformities, which substantially decrease the performance of the posimetric pump.

BRIEF DESCRIPTION OF THE INVENTION

In a first embodiment, a system includes a solid fuel pump. The solid fuel pump includes a housing, a rotor disposed in the housing where the rotor includes a first disc coupled to a hub, a first curved passage disposed between the rotor and the housing on a first axial side of the first disc, a second curved passage disposed between the rotor and the housing on a second axial side of the first disc, a port extending through the housing to the first and second curved passages, and a solid fuel guide disposed in the port where the solid fuel guide is fixed relative to the housing. The solid fuel guide includes a first flow splitter that splits the port into first and second distribution channels leading into the first and second curved passages, and the first flow splitter overlaps the first axial side or the second axial side of the first disc.

In a second embodiment, a system includes a posimetric pump guide configured to mount in a port of a posimetric pump. The posimetric pump guide includes a first flow splitter defining first and second distribution channels into first and second passages in the posimetric pump. The first flow splitter includes a first pair of shroud walls spaced apart about a first disc opening. The posimetric pump guide also includes an abutment extending crosswise to the first flow splitter.

In a third embodiment, a system includes a posimetric solid feed pump. The posimetric solid feed pump includes a housing, a rotor disposed in the housing where the rotor includes a first disc coupled to a hub, a first curved passage disposed between the rotor and the housing on a first axial side of the first disc, a second curved passage disposed between the rotor and the housing on a second axial side of the first disc, an inlet port extending through the housing to the first and second curved passages, and a solid feed guide disposed in the inlet port where the solid feed guide is fixed relative to the housing. The solid feed guide includes a first flow splitter defining first and second distribution channels into the first and second curved passages. The first flow splitter includes a first pair of shroud walls spaced apart about a first disc opening that surrounds a first peripheral portion of the first disc. The first flow splitter also includes a first tapered cover extending between the first pair of shroud walls. The solid feed guide also includes a first abutment extending crosswise to the first flow splitter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a posimetric pump having unique flow enhancement features at an inlet and/or an outlet, thereby improving the performance of the posimetric pump. For example, the posimetric pump may include multiple curved passages defined by parallel rotating discs, wherein the inlet and/or outlet includes a solids guide with at least one flow splitter. The solids guide may gradually turn the solids relative to the curved passages, thereby reducing the possibility of stationary pockets of solids, voids, or other non-uniformities in the posimetric pump. Likewise, the flow splitter may gradually split the flow of solids into multiple distribution channels. In certain embodiments, the flow splitter may overlap at least one of the parallel rotating discs. For example, the flow splitter may include opposite shroud walls that extend about opposite faces of the parallel rotating disc. The overlapping relationship between the flow splitter and the parallel rotating disc may reduce stresses, wear, and flow resistance in the posimetric pump. Various aspects of the posimetric pump are discussed in detail below with reference to FIGS. 1-6.

Figure 1:
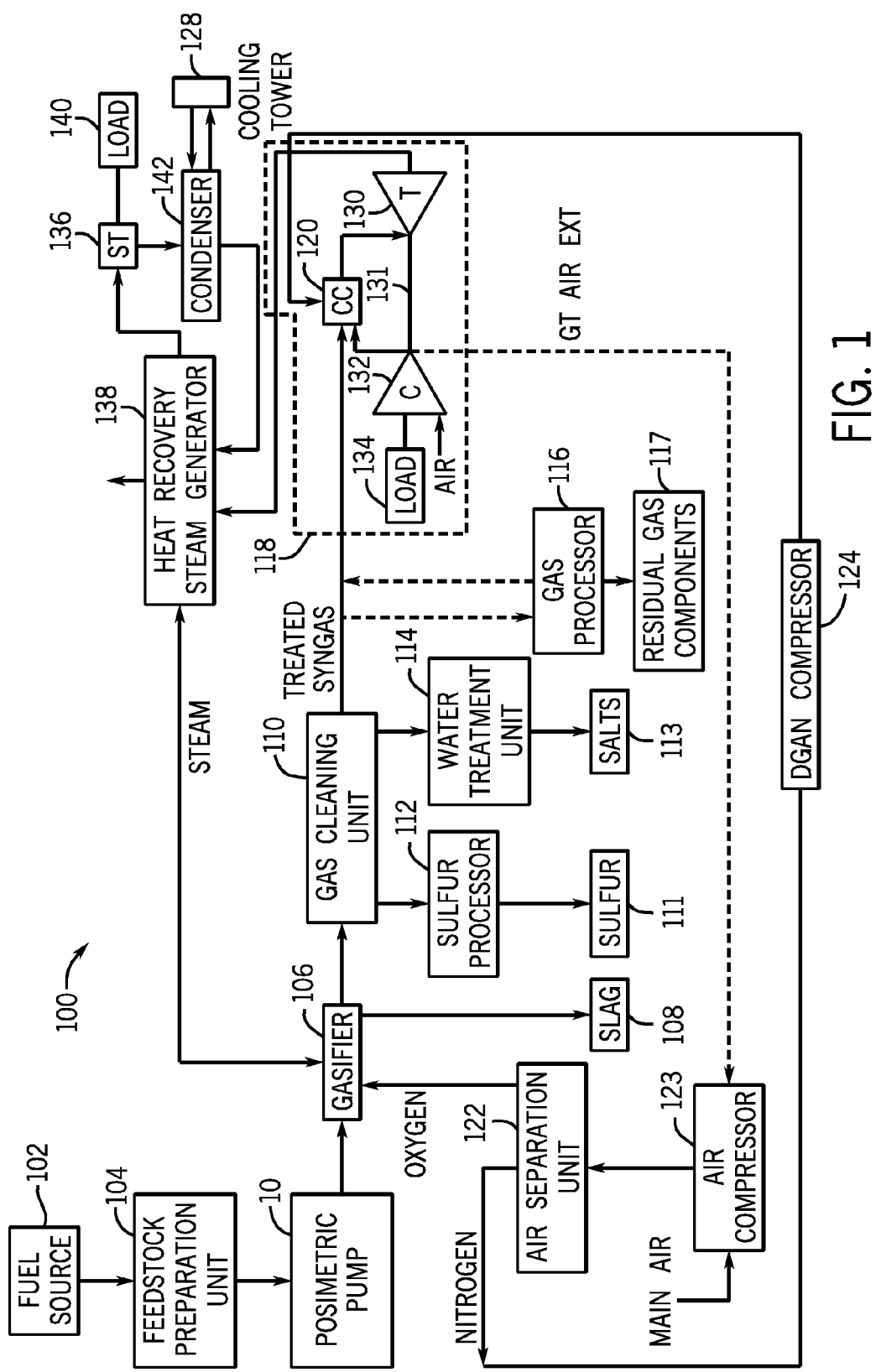
FIG. 1 is a schematic block diagram of an embodiment of an integrated gasification combined cycle (IGCC) power plant utilizing a posimetric pump.

Turning now to the drawings and referring first to FIG. 1, a diagram of an embodiment of an integrated gasification combined cycle (IGCC) system 100 utilizing one or more posimetric pumps 10 is illustrated. The term "posimetric" may be defined as capable of metering (e.g., measuring an amount of) and positively displacing (e.g., trapping and forcing displacement of) a substance being delivered by the pump 10. The pump 10 is able to meter and positively displace a defined volume of a substance, such as a solid fuel feedstock. The pump 10 may be designed either to displace the defined volume of substance into a region of low pressure or a region of high pressure. The pump path may have a circular shape or curved shape. Although the posimetric pump 10 is discussed with reference to the IGCC system 100 in FIG. 1, the disclosed embodiments of the posimetric pump 10 may be used in any suitable application (e.g., production of chemicals, fertilizers, substitute natural gas, transportation fuels, or hydrogen). In other words, the following discussion of the IGCC system 100 is not intended to limit the disclosed embodiments to IGCC.

The IGCC system 100 produces and burns a synthetic gas, i.e., syngas, to generate electricity. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, asphalt, or other carbon containing items. The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate a dry feedstock.

In the illustrated embodiment, the posimetric pump 10 delivers the feedstock from the feedstock preparation unit 104 to a gasifier 106. The posimetric pump 10 may be configured to meter and pressurize the fuel source 102 received from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated, raw, or sour syngas, since it contains, for example, $H_2S$. The gasifier 106 may also generate waste, such as slag 108, which may be a wet ash material. This slag 108 may be removed from the gasifier 106 and disposed of, for example, as road base or as another building material. To clean the raw syngas, a gas cleaning unit 110 may be utilized. The gas cleaning unit 110 may scrub the raw syngas to remove the HCl, HF, COS, HCN, and $H_2S$ from the raw syngas, which may include separation of sulfur 111 in a sulfur processor 112 by, for example, an acid gas removal process in the sulfur processor 112. Furthermore, the gas cleaning unit 110 may separate salts 113 from the raw syngas via a water treatment unit 114 that may utilize water purification techniques to generate usable salts 113 from the raw syngas. Subsequently, the gas from the gas cleaning unit 110 may include treated, sweetened, and/or purified syngas, (e.g., the sulfur 111 has been removed from the syngas), with trace amounts of other chemicals, e.g., $NH_3$ (ammonia) and $CH_4$ (methane).

A gas processor 116 may be utilized to remove residual gas components 117 from the treated syngas such as, ammonia and methane, as well as methanol or any residual chemicals. However, removal of residual gas components 117 from the treated syngas is optional, since the treated syngas may be utilized as a fuel even when containing the residual gas components 117, e.g., tail gas. At this point, the treated syngas may include approximately 3% CO, approximately 55% $H_2$, and approximately 40% $CO_2$ and is substantially stripped of $H_2S$. This treated syngas may be transmitted to a combustor 120, e.g., a combustion chamber, of a gas turbine engine 118 as combustible fuel. Alternatively, the $CO_2$ may be removed from the treated syngas prior to transmission to the gas turbine engine.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134 and 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The IGCC system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
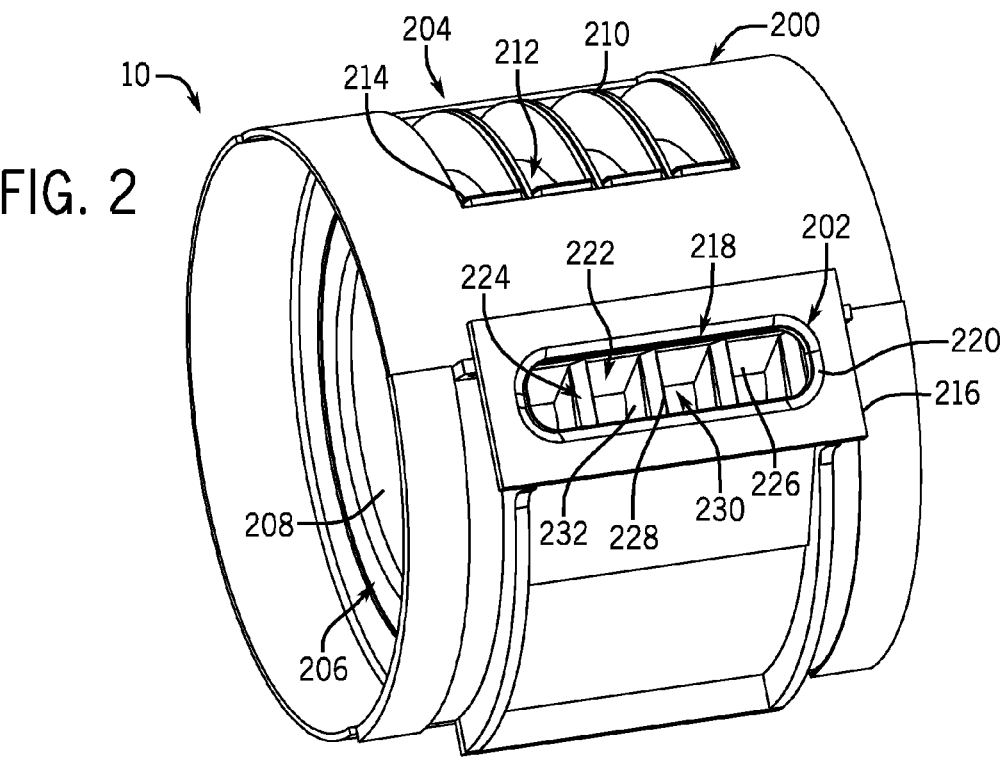
FIG. 2 is a perspective view of an embodiment of a posimetric pump.

As mentioned above, the IGCC system 100 may include one or more posimetric pumps 10. FIG. 2 illustrates a perspective view of an embodiment of the posimetric pump 10. The posimetric pump 10 may include a housing 200, an inlet 202, an outlet 204, and a rotor 206. The rotor 206 may include a hub 208 and multiple substantially opposed and parallel rotary discs 210 coupled to the hub 208. The rotary discs 210 may be movable relative to the housing 200 in a direction from the inlet 202 towards the outlet 204. One or more ducts or curved passages 212 (e.g., annular passages) may extend between the inlet 202 and the outlet 204. The curved passages 212 may be formed between two substantially opposed faces of rotary discs 210. As illustrated, the faces of the rotary discs 210 include teeth to drive the solids from the inlet 202 toward the outlet 204. While the embodiment in FIG. 2 and subsequent figures show four curved passages 212, other embodiments may employ any suitable number of discs for providing two or more curved passages 212. The outlet 204 may include one or more abutments 214 between the curved passages 212 to divert the flow of particulate matter through the outlet 204. The inlet 202 may include an inlet cover 216 having an inlet port 218. A hopper (not shown) may be disposed around an edge 220 of the inlet port 218 to funnel via gravity particulate matter into the inlet port 218. A posimetric pump guide or solid feed guide 222 may be disposed beneath the inlet cover 216 and within the inlet port 218. In other embodiments, the solid feed guide 222 may be disposed within a port of the outlet 204. Portions of the solid feed guide 222 may extend into the curved passages 212. The solid feed guide 222 may be fixed relative to the housing 200. The solid feed guide 222 may include one or more flow splitters 224 and/or one or more abutments 226. The flow splitters 224 may each include a sharp splitter edge 228 to split the flow of particulate matter gradually into the inlet port 218 around the edge 228 into distribution channels 230. For example, the sharp splitter edge 228 may be a tapered portion or diverging portion leading into distribution channels 230. The flow splitters 224 may also each include shroud walls 232, which overlap the discs 210. The abutments 226 may extend crosswise to the flow splitters 224 and across the curved passages 212, thereby gradually turning the flow of particulate matter into the curved passages 212 between rotary discs 210.

For the posimetric pump 10 with multiple passages 212 to operate at maximum efficiency, the unique solid feed guide 222 may ensure efficient and unobstructed flow through the inlet 202 to ensure maximum filling efficiency and flow uniformity through the pump 10. However, in the absence of the unique solid feed guide 222 of the present disclosure, various forces may act against the particulate matter to inhibit or stop the normal flow of the particulate matter at various regions near the inlet 202. For example, as particulate matter is fed through the inlet port 218, the posimetric pump 10 may impart a tangential force or thrust to the particulate matter in the rotational direction of the rotor 206. This force may cause the particulate matter to form a dead or stationary zone near the inlet 202, which can increase stresses, friction, wear, and heat generation in the posimetric pump 10. More specifically, as particulate matter enters through the inlet port 218 into the posimetric pump 10, operating at high speed conditions (e.g., 15 revolutions per minute (RPM)), the flow velocity of the particulate matter may not be uniform between the curved passages 212 near the inlet port 218. In addition, air bubbles may form within the flow of the particulate matter near both where the particulate matter enters through the inlet port 218 and near an inner surface of the inlet cover 216 adjacent the inlet 202. Within these air bubbles, particulate matter may be loose with high velocities. This non-uniformity of the flow of the particulate matter may hinder the filling efficiency and throughput capability of the posimetric pump 10. In addition, the posimetric pump 10 may not be able to operate at a higher pumping rate since operations at a higher speed may increase the non-uniformity of the flow.

Besides non-uniformity of the flow and poor filling efficiency, the absence of the solid feed guide 222 may increase the abrasion of the rotary discs 210 and the inner surface of the inlet cover 216 adjacent the inlet 202. As particulate matter enters through the inlet port 218 into the posimetric pump 10, particulate matter may concentrate with high forces near the inlet 202 between the outer edges of the rotary discs 210 and the inner surface of the inlet cover 216 adjacent the inlet 202. The concentrated particulate matter may stick in these regions leading to high stresses that may result in the abrasion of the rotary discs 210 and inner surface of the inlet cover 216, as well as heat generation. Also, these high stresses may increase the requirements for more torque to operate the posimetric pump 10.

Figure 3:
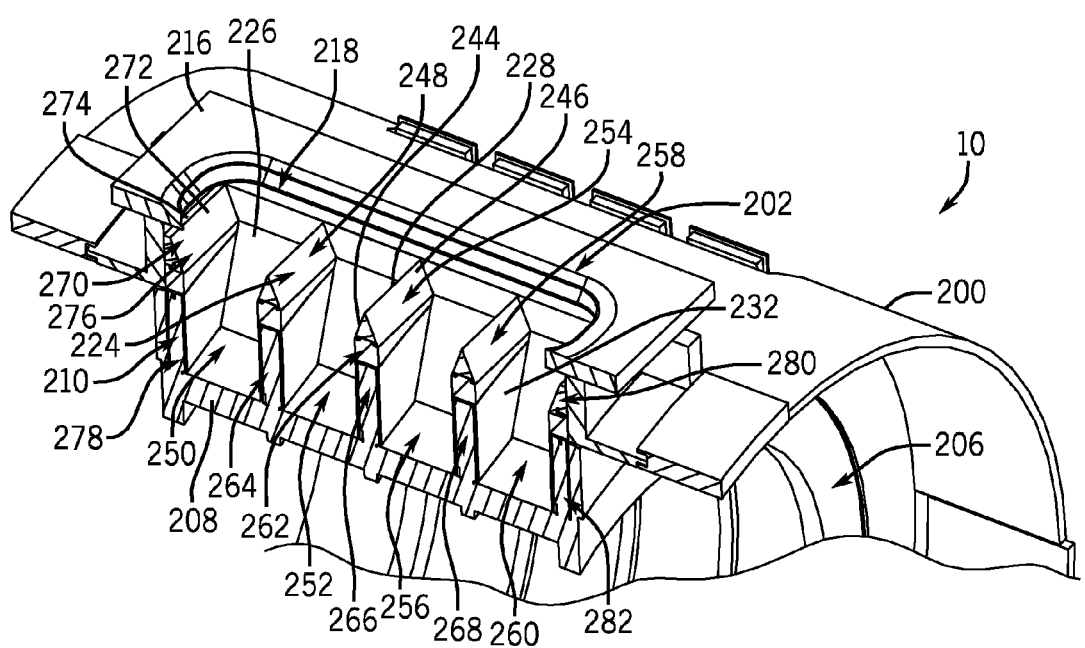
FIG. 3 is a perspective cutaway view of an embodiment of the posimetric pump illustrated in FIG. 2.

Features of the solid feed guide 222, as shown in FIGS. 3-6, may alleviate these problems. FIG. 3 illustrates a perspective cutaway view of an embodiment of the posimetric pump 10 along the axis of the pump 10. Similar to above, the posimetric pump 10 may include the housing 200, the inlet 202, the outlet 204, and the rotor 206. The rotor 206 may include the hub 208 and multiple substantially opposed and parallel rotary discs 210 coupled to the hub 208 forming curved passages 212 between the axial sides of the rotary discs 210. The inlet 202 may include the inlet cover 216 with the inlet port 218. As illustrated, the inlet port 218 spans multiple ducts or curved passages 212.

The solid feed guide 222 may be disposed beneath the inlet cover 216 and within the inlet port 218. In other embodiments, the solid feed guide 222 may be disposed within a port of the outlet 204. Portions of the solid feed guide 222 may extend into the curved passages 212. The solid feed guide 222 may include one or more flow splitters 224 located above some of the rotary discs 210. The flow splitters 224 may each include two sides 244 and 246 that converge to form the sharp splitter edge 228. The sharp splitter edge 228 of each flow splitter 224 may split the flow of particulate matter into the inlet port 218 around the edge 228 and into distribution channels 230. The sides 244 and 246 diverge away from one another at a splitter angle (e.g., taper angle) from the sharp splitter edge 228 into the pump 10. For example, the splitter angle may range between approximately 0 to 90 degrees, 0 to 60 degrees, 0 to 45 degrees, 0 to 30 degrees, or 0 to 15 degrees. By further example, the splitter angle may be approximately 5, 10, 15, 20, 25, 30, 35, 40 or 45 degrees, or any angle therebetween. The solid feed guide 222 may include any number and configuration of flow splitters 224 and associated distribution channels 230 depending on the arrangement of discs. For example, a first flow splitter 248 may define a first distribution channel 250 and a second distribution channel 252, a second flow splitter 254 may define the second distribution channel 252 and a third distribution channel 256, and a third flow splitter 258 may define the third distribution channel 256 and a fourth distribution channel 260.

The flow splitters 224 located above the rotary discs 210 may overlap one or both axial sides of the discs 210. For example, the flow splitters 224 may each include a pair of shroud walls 232 that form a disc opening 262. The pair of shroud walls 232 may surround a peripheral portion of the rotary disc 210 located within disc opening 262. Thus, the flow splitters 224 may overlap both axial sides of the rotary discs 210. For example, the first flow splitter 248 may overlap one or both axial sides of rotary disc 264, the second flow splitter 254 may overlap one or both axial sides of rotary disc 266, and the third flow splitter 256 may overlap one or both axial sides of rotary disc 268. The overlapping of the axial sides of rotary discs 210 by shroud walls 232 of the flow splitters 224 may protect the rotary discs 210 from abrasion and improves the flow of solids into the pump 10 by altering the interaction between the downward falling solids entering the pump 10 and the rotating pump discs 210.

Besides flow splitters 224, the solid feed guide 222 may include flow guides 270 located on the ends of the solid feed guide 222 to help guide the flow of particulate matter into the distribution channels of the posimetric pump 10 while protecting the rotary discs 210. The flow guides 270 may be similar to flow splitters 224 in all aspects except each flow guide 270 may include a single side 272 as opposed to two sides 244 and 246. The side 272 may also be angled in the flow direction (e.g., radial direction) into the pump 10 away from a top portion 274 of the side 272. For example, the angle may range between approximately 0 to 90 degrees, 0 to 60 degrees, 0 to 45 degrees, 0 to 30 degrees, or 0 to 15 degrees. By further example, the angle may be approximately 5, 10, 15, 20, 25, 30, 35, 40 or 45 degrees, or any angle therebetween.

The flow guides 270 located above the rotary discs 210 may overlap the discs 210. The flow guides 270 may each include a single shroud wall 232 or pair of shroud walls 232 that may form disc opening 262. The pair of shroud walls 232 may surround a peripheral portion of the rotary disc 210 located within disc opening 262. Thus, the flow guides 270 may overlap one or both axial sides of the rotary discs 210. For example, flow guide 276 may overlap one or both axial sides of rotary disc 278 and flow guide 280 may overlap one or more both sides of rotary disc 282. The overlapping of the axial sides of rotary discs 210 by shroud walls 232 of the flow splitters 270 may also protect the rotary discs 210 from abrasion.

The solid feed guide 222 may also include one or more abutments 226. The abutments 226 may extend crosswise to the flow splitters 224 and flow guides 270 and across the curved passages 212. In addition, the abutments 226 may extend radially outward from right above the hub 208 of the rotor 206 towards the inlet port 218. The abutments 226 may be angled in a radial direction relative to the rotor 206. For example, the radial angle (i.e., angle between abutment 226 and a radial line extending from the rotor 206) may range between approximately plus or minus 0 to 90 degrees, 0 to 60 degrees, 0 to 45 degrees, 0 to 30 degrees, or 0 to 15 degrees. By further example, the radial angle may be approximately plus or minus 0, 5, 10, 15, 20, 25, 30, 35, 40, or 45 degrees, or any angle therebetween.

Figure 4:
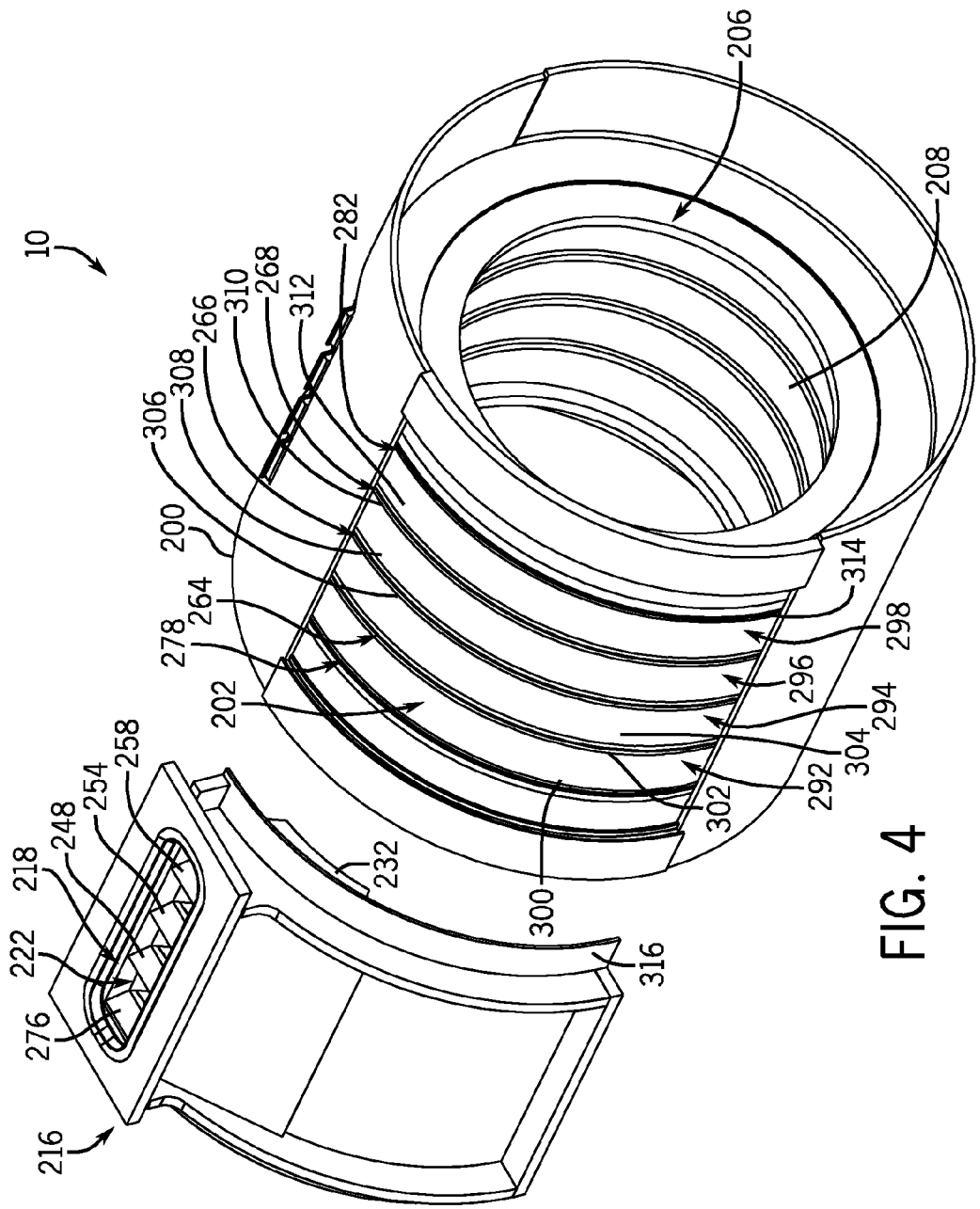
FIG. 4 is a perspective exploded view of an embodiment of the posimetric pump illustrated in FIG. 2.

FIG. 4 illustrates an exploded perspective view of an embodiment of the posimetric pump 10. The posimetric pump 10 may include the housing 200 enclosing the rotor 206 that includes the hub 208 coupled to multiple rotary discs 278, 264, 266, 268, and 282. While the embodiment in FIG. 4 shows five rotary discs 278, 264, 266, 268, and 282 forming four curved passages 292, 294, 296, and 298, other embodiments may employ any suitable number of rotary discs 210 for providing two or more curved passages 212. Rotary disc 278 may include axial side 300 and another axial side. Rotary disc 264 may include axial sides 302 and 304. Rotary disc 266 may include axial sides 306 and 308. Rotary disc 268 may include axial sides 310 and 312. Rotary disc 282 may include axial side 314 and another axial side. First curved passage 292 may be disposed between axial side 300 of rotary disc 278 and axial side 302 of rotary disc 264. Second curved passage 294 may be disposed between axial side 304 of rotary disc 264 and axial side 306 of rotary disc 266. Third curved passage 296 may be disposed between axial side 308 of rotary disc 266 and axial side 310 of rotary disc 268. Fourth curved passage 298 may be disposed between axial side 312 of rotary disc 268 and axial side 310 of rotary disc 282.

The posimetric pump 10 may also include the inlet 202 that includes the inlet cover 216 with the inlet port 218. The inlet cover 216 may also include a body 316 that tangentially follows the curved shape of the housing 200. The solid feed guide 222 may be disposed beneath the inlet cover 216 and within the inlet port 218. The solid feed guide 222 may be coupled to the inlet cover 216 via fasteners (e.g., bolts) for easy removal or replacement. The fasteners may also allow adjustments to fine tune the performance of the solid feed guide 222 based on the fuel properties and operating conditions of the posimetric pump 10. The solid feed guide 222 may include flow guides 276 and 280 and flow splitters 248, 254, and 258. The flow guides 276 and 280 and flow splitters 248, 254, and 258 may include one or more shroud walls 232 that tangentially follow the curved shape of the rotor 206. The flow guides 276 and 280 may overlap peripheral portions of rotary discs 278 and 282, respectively. The flow splitters 248, 254, and 258 may overlap peripheral portions of rotary discs 264, 266, and 268, respectively.

Figure 5:
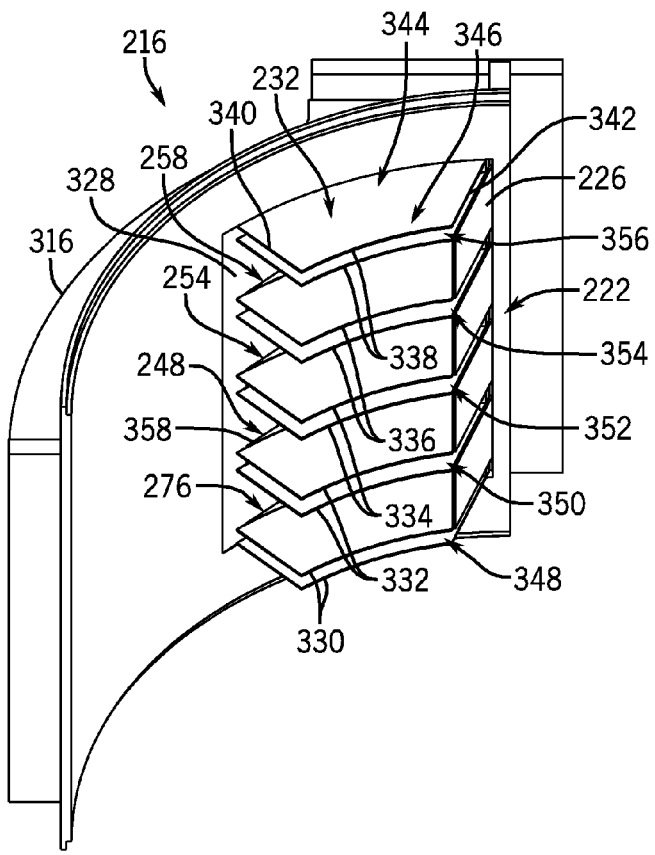
FIG. 5 is a perspective view of an inner surface of an embodiment of an inlet cover with a solid feed guide.

FIG. 5 is a perspective view of an inner surface 328 of the inlet cover 216 that includes the solid feed guide 222, illustrating interior features of the solid feed guide 222 that interact with the rotary discs 210. The solid feed guide 222 includes multiple pairs of shroud walls 330, 332, 334, 336, and 338. The pairs of shroud walls 330 and 338 may be portions of flow guides 276 and 280, respectively. The pairs of shroud walls 332, 334, and 336 may be portions of flow splitters 248, 254, and 258, respectively. Sides 340 and 342 of each shroud wall 232 may taper from a top portion 344 of shroud wall 232 to a bottom portion 346 of the shroud wall 232. The bottom portion 346 of the shroud wall 232 may tangentially follow the curve of the rotor 206. The surface area of each shroud wall 232 may be the same or different from one shroud wall 232 to another. Also, the surface area of each pair of shroud walls 232 may be the same or different from one pair of shroud walls 232 to another. Each pair of shroud walls 330, 332, 334, 336, and 338 may be spaced apart to form disc openings 348, 350, 352, 354, and 356 for rotary discs 278, 264, 266, 268, and 282, respectively. Abutments 226 may be disposed between each pair of shroud walls 232. The abutment 226 may be located near the side 342 of the shroud wall 232 and may extend from adjacent the top portion 344 to adjacent the bottom portion of the shroud wall 232. The flow guides 270 and flow splitters 224 may also include a cover 358 extending between each pair of shroud walls 232 disposed above the top portion 344 of the shroud walls 232. The cover 358 may extend almost towards the side 340 of the shroud wall 232. Thus, the cover 358 may fill the gaps between the edges of the rotary discs 210 and the inner surface 328 of the inlet cover 216. As a result, each pair of shroud walls 232, in conjunction, with the cover 358 may protect the rotary discs 210 and both the inner surface 328 of the inlet cover 216 from abrasion.

Figure 6:
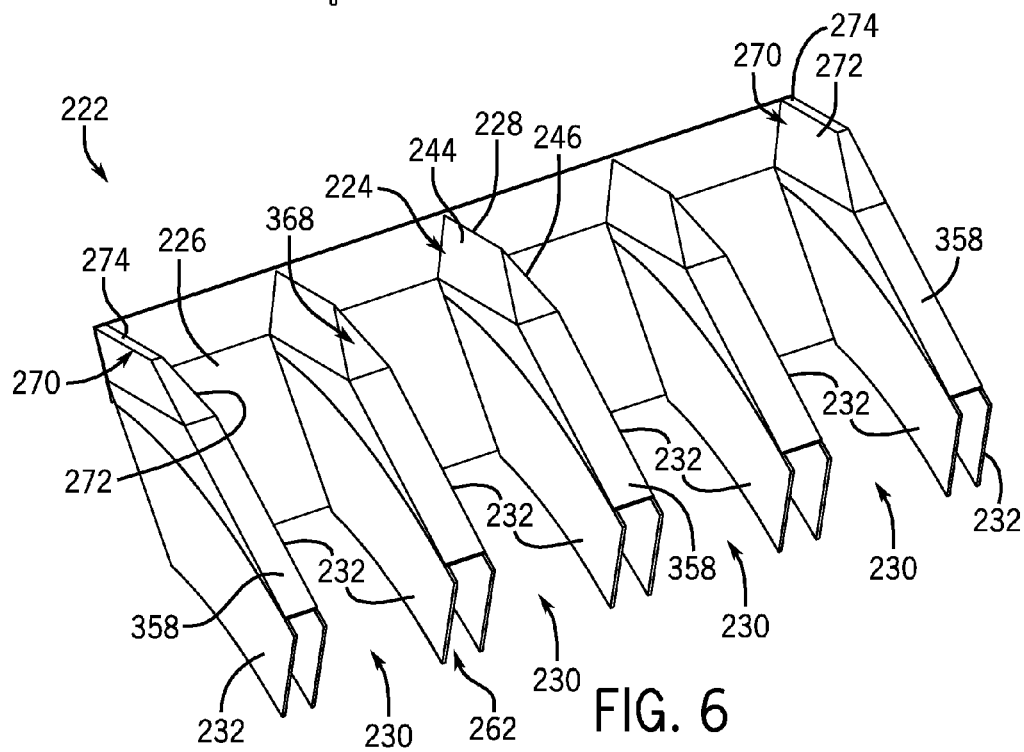
FIG. 6 is a perspective view of an embodiment of a solid feed guide.

FIG. 6 is a perspective view of the solid feed guide 222 further illustrating features of the flow splitters 224 and abutments 226. As mentioned above, the solid feed guide 222 may be disposed within inlet port 218 of inlet 202 or a port of outlet 204 of posimetric pump 10. The solid feed guide 222 may include abutments 226, flow splitters 224, and flow guides 270. The abutments 226 may be disposed between the flow splitters 224 and/or flow guides 270. The abutments 226 may be radially angled with respect to the rotor 206, as described above. The flow splitters 224 may include sides 244 and 246 that converge to form sharp splitter edge 228. The sides 244 and 246 may form a splitter angle with respect to the edge 228, as described above. The flow guides 270 each include side 272 that may form an axial angle with respect to the top portion 274 of each flow guide 270, as described above. The flow splitters 224 and/or flow guides 270 may include pairs of shroud walls 232 spaced about disc openings 262 for the rotary discs 210. The surface area of each shroud wall 232 may be the same or different from one shroud wall 232 to another. Also, the surface area of each pair of shroud walls 232 may be the same or different from one pair of shroud walls 232 to another. Alternatively, the flow guides 270 may include a single shroud wall 232. In addition, the flow splitters 224 and or/flow guides 270 may include cover 358. The cover 358 may extend adjacent the shroud wall 232 in embodiments that include flow guides 270 with the single shroud wall 232. The cover 358 may also extend between pairs of shroud walls 232. The cover 358 may also include a tapered portion 368 that may include sharp splitter edge 228 (e.g., the flow splitter 224) disposed adjacent the abutment 226. The tapered portion 368 of the cover 358 may diverge towards the single shroud wall 232 or pair of shroud walls 232.

The parts of the solid feed guide 222 may be smooth and may include material having a low friction coefficient to assist the flow of the particulate matter through the multiple distribution channels 230 into the multiple curved passages 212. Materials that may form the solid feed guide 222 may include high molecular weight plastic, aluminum, stainless steel, or other materials with a low friction coefficient. Thus, as particulate matter encounters the smooth, low friction surfaces of the solid feed guide 222, the flow of the particulate matter may be uniformly guided via the angled abutments 226, the sharp splitter edges 228 and tapered portions 368 of the flow splitters 224, and the angled sides 272 and tapered portions 368 of the flow guides 270 into multiple distribution channels 230 leading into multiple passages 212 of the posimetric pump 10. In addition, the shroud walls 232 and tapered covers 358 may overlap with and surround peripheral portions of rotary discs 210 that may change the interaction between the free falling particulate matter and the rotary discs 210 and may protect the discs 210 and other materials of the posimetric pump 10 from abrasion. Further, the solid feed guide 222 may also prevent both the formation of stationary pockets of particulate matter and the buildup of particulate matter between the edges of the rotary discs 210 and the inner surface 328 of the inlet cover 216. Also, the solid feed guide 222 may remove air bubbles formed near both where the particulate matter enters through inlet port 218 and near the inner surface 328 of the inlet cover 216 by compacting the particulate matter upon entry through the inlet opening 218. As a result, the solid feed guide 222 may improve flow uniformity and filling efficiency, reduce abrasion, improve throughput capability, increase rotational speed, as well as reduce the power consumption and torque requirements of the posimetric pump 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a solid fuel pump, comprising:
   a housing;
   a rotor disposed in the housing, wherein the rotor comprises a first disc coupled to a hub;
   a first curved passage disposed between the rotor and the housing on a first axial side of the first disc;
   a second curved passage disposed between the rotor and the housing on a second axial side of the first disc;
   a port extending through the housing to the first and second curved passages; and
   a solid fuel guide disposed in the port, wherein the solid fuel guide is fixed relative to the housing, the solid fuel guide comprises a first flow splitter that splits the port into first and second distribution channels leading into the first and second curved passages, and the first flow splitter overlaps the first axial side or the second axial side of the first disc.

2. The system of claim 1, wherein the port is a solid fuel inlet into the first and second curved passages.

3. The system of claim 1, wherein the port is a solid fuel outlet from the first and second curved passages.

4. The system of claim 1, wherein the solid fuel guide comprises at least one abutment that blocks the first and second curved passages adjacent the port, wherein the at least one abutment extends radially outward from the rotor across the first and second curved passages toward the port.

5. The system of claim 1, wherein the first flow splitter overlaps the first axial side and the second axial side of the first disc, and the first disc extends into a slot between a first pair of shroud walls of the first disc.

6. The system of claim 1, wherein the rotor comprises a second disc coupled to the hub, the second disc separates the second curved passage and a third curved passage inside the housing, the solid fuel guide comprises a second flow splitter between the second distribution channel and a third distribution channel, and the second flow splitter overlaps with a third axial side or a fourth axial side of the second disc.

7. The system of claim 6, wherein the rotor comprises a third disc coupled to the hub, the third disc separates the third curved passage and a fourth curved passage inside the housing, the solid fuel guide comprises a third flow splitter between the third distribution channel and a fourth distribution channel, and the third flow splitter overlaps with a fifth axial side or a sixth axial side of the third disc.

8. The system of claim 7, wherein the first flow splitter comprises a first pair of shroud walls surrounding a first peripheral portion of the first disc, the second flow splitter comprises a second pair of shroud walls surrounding a second peripheral portion of the second disc, and the third flow splitter comprises a third pair of shroud walls surrounding a third peripheral portion of the third disc.

9. The system of claim 1, wherein the first flow splitter comprises a first pair of shroud walls surrounding a first peripheral portion of the first disc, the first flow splitter comprises a first cover extending between the first pair of shroud walls, and the first cover comprises a taper that diverges toward the first pair of shroud walls.

10. A system, comprising:
    a posimetric pump guide configured to mount in a port of a posimetric pump, wherein the posimetric pump guide comprises a first flow splitter defining first and second distribution channels into first and second passages in the posimetric pump, the first flow splitter comprises a first pair of shroud walls spaced apart about a first disc opening, and the posimetric pump guide comprises an abutment extending crosswise to the first flow splitter.

11. The system of claim 10, comprising the posimetric pump having the posimetric pump guide disposed in the port.

12. The system of claim 10, wherein the first flow splitter comprises a first cover extending between the first pair of shroud walls.

13. The system of claim 12, wherein the first cover comprises a first tapered portion that diverges toward the first pair of shroud walls.

14. The system of claim 13, wherein the first tapered portion is disposed adjacent the abutment.

15. The system of claim 10, wherein the posimetric pump guide comprises a second flow splitter defining the second distribution channel and a third distribution channel into the second passage and a third passage in the posimetric pump, and the second flow splitter comprises a second pair of shroud walls spaced apart about a second disc opening.

16. The system of claim 15, wherein the posimetric pump guide comprises a third flow splitter defining the third distribution channel and a fourth distribution channel into the third passage and a fourth passage in the posimetric pump, and the third flow splitter comprises a third pair of shroud walls spaced apart about a third disc opening.

17. The system of claim 16, wherein the first flow splitter comprises a first tapered cover extending between the first pair of shroud walls, the second flow splitter comprises a second tapered cover extending between the second pair of shroud walls, and the third flow splitter comprises a third tapered cover extending between the third pair of shroud walls.

18. A system, comprising:
    a posimetric solid feed pump, comprising:
    a housing;
    a rotor disposed in the housing, wherein the rotor comprises a first disc coupled to a hub;
    a first curved passage disposed between the rotor and the housing on a first axial side of the first disc;
    a second curved passage disposed between the rotor and the housing on a second axial side of the first disc;
    an inlet port extending through the housing to the first and second curved passages; and
    a solid feed guide disposed in the inlet port, wherein the solid feed guide is fixed relative to the housing, the solid feed guide comprises a first flow splitter defining first and second distribution channels into the first and second curved passages, the first flow splitter comprises a first pair of shroud walls spaced apart about a first disc opening that surrounds a first peripheral portion of the first disc, the first flow splitter comprises a first tapered cover extending between the first pair of shroud walls, and the solid feed guide comprises a first abutment extending crosswise to the first flow splitter.

19. The system of claim 18, wherein the solid feed guide comprises a second flow splitter defining the second distribution channel and a third distribution channel into the second curved passage and a third curved passage in the posimetric solid feed pump, the second flow splitter comprises a second pair of shroud walls spaced apart about a second disc opening that surrounds a second peripheral portion of a second disc coupled to the hub, the second flow splitter comprises a second tapered cover extending between the second pair of shroud walls, and the solid feed guide comprises a second abutment extending crosswise to the second flow splitter.

20. The system of claim 19, wherein the solid feed guide comprises a third flow splitter defining the third distribution channel and a fourth distribution channel into the third curved passage and a fourth curved passage in the posimetric solid feed pump, the third flow splitter comprises a third pair of shroud walls spaced apart about a third disc opening that surrounds a third peripheral portion of a third disc coupled to the hub, the third flow splitter comprises a third tapered cover extending between the third pair of shroud walls, and the solid feed guide comprises a third abutment extending crosswise to the third flow splitter.

\* \* \* \* \*